(12) United States Patent
Brooks et al.

(10) Patent No.: US 10,369,585 B2
(45) Date of Patent: Aug. 6, 2019

(54) AUTOMATIC RINSE SYSTEM FOR AN AGRICULTURAL SPRAYER

(71) Applicant: CNH Industrial America LLC, New Holland, PA (US)

(72) Inventors: Nathan P. Brooks, Manitowoc, WI (US); Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/657,942

(22) Filed: Jul. 24, 2017

(65) Prior Publication Data

US 2019/0022687 A1   Jan. 24, 2019

(51) Int. Cl.
*B05B 15/00* (2018.01)
*B05B 15/55* (2018.01)
*A01M 7/00* (2006.01)
*B05B 1/20* (2006.01)

(52) U.S. Cl.
CPC .......... *B05B 15/55* (2018.02); *A01M 7/0042* (2013.01); *A01M 7/0089* (2013.01); *B05B 1/20* (2013.01)

(58) Field of Classification Search
CPC ..... B05B 7/0408; B05B 12/149; B05B 15/50; B05B 15/55
USPC ........................................... 239/11, 112, 113
See application file for complete search history.

(56) References Cited

U.S. PATENT DOCUMENTS 3,481,540 A * 12/1969 Eggerstedt .......... A01M 7/0092
239/1
3,587,971 A    6/1971 Alexander et al.
4,005,803 A * 2/1977 Kent .................... A01M 7/0092
137/114
4,092,993 A * 6/1978 Stevenson ........... A01M 7/0092
137/15.01
4,274,585 A * 6/1981 Lestradet ............ A01M 7/0089
222/614
4,629,164 A * 12/1986 Sommerville ...... A01M 7/0092
222/23

(Continued)

FOREIGN PATENT DOCUMENTS

| CN | 205851200 U | 1/2017 |
|---|---|---|
| EP | 2703095 A1 | 3/2014 |
| JP | 6213779 A | 5/1994 |

OTHER PUBLICATIONS

Spraying Systems Co.; Conveyor Cleaning & Dust Solutions; http://www.spray.com.au/markets_and_applications/mining_conveyor-solutions.aspx (2) pages.

*Primary Examiner* — Viet Le
(74) *Attorney, Agent, or Firm* — Rebecca L. Henkel; Rickard K. DeMille

(57) ABSTRACT

A rinse monitoring and control system for a self-propelled sprayer is configured to allow automatic rinsing of plumbing components and tubing of the sprayer with a liquid rinse by automatically controlling the timing and sequencing of electronic valves upon receiving a rinse command. Aspects of the rinsing can be configured by an operator, such as the whether the product tank is rinsed, the duration of each rinse, and the number of rinse cycles. The valves and liquid flow can be monitored in real time from a touchscreen HMI during the rinsing. Accordingly, the sprayer can be thoroughly rinsed by pressing a single button to generate the rinse command, without requiring the operator to manually actuate valves and/or recall stages of the rinse sequence.

19 Claims, 7 Drawing Sheets

(56) References Cited

U.S. PATENT DOCUMENTS

| | | | | |
|---|---|---|---|---|
| 4,723,709 A * | 2/1988 | Curran, Jr. | A01M 7/0042 | 239/110 |
| 4,813,604 A * | 3/1989 | Curran, Jr. | A01M 7/0042 | 239/163 |
| 5,125,576 A | 6/1992 | Ziegenbein | | |
| 5,133,500 A * | 7/1992 | Simpson | A01M 7/0082 | 239/150 |
| 5,260,875 A * | 11/1993 | Tofte | A01B 79/005 | 111/903 |
| 5,337,959 A * | 8/1994 | Boyd | A01M 7/0089 | 239/127 |
| 5,433,380 A * | 7/1995 | Hahn | A01M 7/0085 | 134/169 R |
| 5,475,614 A * | 12/1995 | Tofte | A01M 7/0089 | 700/283 |
| 5,741,090 A * | 4/1998 | Dunning | A01C 23/028 | 111/127 |
| 5,884,205 A * | 3/1999 | Elmore | A01B 79/005 | 222/63 |
| 5,911,362 A * | 6/1999 | Wood | A01M 7/0089 | 239/1 |
| 6,009,354 A * | 12/1999 | Flamme | A01B 79/005 | 172/4.5 |
| 6,702,201 B2 * | 3/2004 | Guesdon | A01M 7/0092 | 239/146 |
| 6,711,949 B1 * | 3/2004 | Sorenson | G01F 23/38 | 340/623 |
| 6,776,355 B2 * | 8/2004 | Ringer | A01M 7/0089 | 239/159 |
| 6,840,464 B2 * | 1/2005 | Engelbrecht | B05B 1/265 | 239/461 |
| 7,124,961 B2 * | 10/2006 | Wilting | A01M 7/0089 | 239/124 |
| 7,435,581 B2 * | 10/2008 | West | C12M 41/48 | 239/66 |
| 7,502,665 B2 * | 3/2009 | Giles | A01B 79/005 | 700/241 |
| 7,706,926 B2 * | 4/2010 | Peterson | A01C 23/007 | 137/12 |
| 8,028,927 B2 * | 10/2011 | Ward | A01M 7/0089 | 239/1 |
| 8,191,798 B2 * | 6/2012 | Hahn | A01C 23/007 | 239/11 |
| 8,777,125 B2 * | 7/2014 | Honermann | A01M 7/0082 | 137/343 |
| 8,844,838 B2 * | 9/2014 | Funseth | A01M 7/0089 | 239/100 |
| 9,435,458 B2 | 9/2016 | Needham et al. | | |
| 9,554,506 B2 * | 1/2017 | Bittner | A01M 7/0089 | |
| 9,781,916 B2 * | 10/2017 | Preheim | A01M 7/0089 | |
| 2002/0107609 A1 * | 8/2002 | Benneweis | A01B 79/005 | 700/231 |
| 2003/0230522 A1 * | 12/2003 | Pavel | B01D 61/022 | 210/137 |
| 2006/0273189 A1 * | 12/2006 | Grimm | B05B 9/0423 | 239/146 |
| 2008/0230624 A1 * | 9/2008 | Giles | F16K 31/0655 | 239/69 |
| 2010/0019485 A1 * | 1/2010 | Huegerich | F04B 49/065 | 285/119 |
| 2010/0032492 A1 * | 2/2010 | Grimm | A01M 7/0089 | 239/1 |
| 2011/0054743 A1 * | 3/2011 | Kocer | A01B 79/005 | 701/50 |
| 2011/0160920 A1 * | 6/2011 | Orr | A01B 79/005 | 700/283 |
| 2011/0179984 A1 * | 7/2011 | Beaujot | A01C 7/06 | 111/174 |
| 2011/0270494 A1 * | 11/2011 | Imhof | A01D 41/142 | 701/50 |
| 2012/0168530 A1 * | 7/2012 | Ellingson | B05B 12/008 | 239/71 |
| 2012/0169495 A1 * | 7/2012 | Kowalchuk | A01C 7/088 | 340/540 |
| 2012/0195496 A1 * | 8/2012 | Zaman | A01M 7/0089 | 382/162 |
| 2012/0211508 A1 * | 8/2012 | Barsi | A01C 7/081 | 221/13 |
| 2013/0320105 A1 * | 12/2013 | Schmidt | A01G 25/16 | 239/1 |
| 2014/0116153 A1 * | 5/2014 | Stewart | G01F 1/52 | 73/861 |
| 2014/0252111 A1 * | 9/2014 | Michael | B05B 15/025 | 239/11 |
| 2014/0263709 A1 * | 9/2014 | Kocer | B05B 1/30 | 239/11 |
| 2015/0367352 A1 * | 12/2015 | Burchardt | B02C 21/00 | 241/24.1 |
| 2015/0367357 A1 * | 12/2015 | Humpal | B05B 1/30 | 239/1 |
| 2015/0367358 A1 * | 12/2015 | Funseth | A01G 25/16 | 239/159 |
| 2015/0375247 A1 * | 12/2015 | Funseth | B05B 12/04 | 239/68 |
| 2016/0175869 A1 * | 6/2016 | Sullivan | B05B 12/008 | 239/11 |
| 2016/0178422 A1 * | 6/2016 | Humpal | A01M 7/0042 | 239/71 |

* cited by examiner

AUTOMATIC RINSE SYSTEM FOR AN AGRICULTURAL SPRAYER

FIELD OF THE INVENTION

The invention relates generally to agricultural product application equipment such as self-propelled sprayers and, in particular, to a flow monitoring and control system for a self-propelled sprayer that is configured to receive a rinse command upon which a control system controls one or more of valve systems for rinsing plumbing components of the self-propelled sprayer with a rinse liquid.

BACKGROUND OF THE INVENTION

Over time, agricultural sprayers have gotten larger to increase machine efficiency with wider booms that can cover more area in a single pass. The operational systems of sprayers have correspondingly gotten more powerful and complex. Such complex operational systems include product delivery systems that direct stored product to multiple spray sections of the boom and can include rinse and air systems for liquid and pneumatic purging of various lines of the sprayer. It is often desirable to rinse the product delivery system from time to time with a rinse liquid, such as clean water. However, to rinse the system, operators typically must manually sequence and time multiple valves to run the rinse liquid though the spray circuit. This can lead to a number of potential issues, such as misaligning the valves, not rinsing enough to properly clean the pipes, unnecessarily putting the operator in contact with harmful chemicals, and/or adding more steps for the operator to remember.

SUMMARY OF THE INVENTION

A rinse monitoring and control system for a self-propelled sprayer is configured to allow automatic rinsing of plumbing components and tubing of the sprayer with a liquid rinse by automatically controlling the timing and sequencing of electronic valves upon receiving a rinse command. Aspects of the rinsing can be configured by an operator, such as the whether the product tank is rinsed, the duration of each rinse, and the number of rinse cycles. The valves and liquid flow can be monitored in real time from a touchscreen HMI during the rinsing. Accordingly, the sprayer can be thoroughly rinsed by pressing a single button to generate the rinse command, without requiring the operator to manually actuate valves and/or recall stages of the rinse sequence.

According to one aspect of the invention, a "one touch" rinse system for sprayers allows sprayer pipes, valves, tanks and the like to be more efficiently cleaned for storage, transport, or a new chemical. The sprayers can provide complete electronic control of any and all ball valves, product pumps, sumps and a logic controller. The "one touch" system can allow an operator of the sprayer to press a single button to provide automatic rinsing, which can include checking the system for rinsing readiness, sequencing and timing electronic valves to complete a rinse cycle when ready, and executing multiple rinse cycles if desired, without further demands being placed on the operator. The button could be, for example, a physical button that is configured in the operator cab, and/or a virtual button that is implemented via a touchscreen HMI, field computer, virtual terminal (VT), or the like. As a result, an operator need not manually rotate sprayer valves by hand, or be required to remember correct stages or sequences for thorough rinsing. Accordingly, such automatic rinsing can ensure consistent and correct rinse sequences are provided for sprayers when rinsing is desired.

According to one aspect of the invention, automatic rinsing can use a logic controller to sequence electronically controlled valves in a manner that properly cleans the pipes with various combinations of valve states. Automatic rinsing can start pumps, control the valves, times the sequences and repeat until a certain number of cycles are complete. Automatic rinsing can be completely customizable for the sprayer depending on the configuration of valves, tanks and plumbing. Automatic rinsing can execute an algorithm to determine an optimal solution for rinsing the machine as configured. The algorithm can include input from a user, including whether particular sections of the sprayer are to be cleaned, such the product tanks, the extent and/or timing of each rinsing, and/or the number of rinsing cycles. The logic controller could be placed on an International Organization for Standardization (ISO) bus or a Controller Area Network (CAN) bus, so that an operator could easily interact with the logic controller via a touchscreen HMI, field computer, virtual terminal (VT), or the like.

Specifically then, one aspect of the present invention provides a rinse system for a self-propelled agricultural sprayer. The rinse system can include: a product storage system having a product tank storing an agricultural liquid product on a chassis of the sprayer; a rinse liquid storage system having a rinse tank storing a rinse liquid on the chassis; a spray boom supported by the chassis of the sprayer and defining multiple spray sections for receiving the liquid product and the rinse liquid and selectively delivering the liquid product and the rinse liquid to a field; an on-board valve system including a product tank outlet valve configured to actuate between a closed position preventing flow of the liquid product out of the product tank and an open position permitting flow of the liquid product out of the product tank and a rinse tank outlet valve configured to actuate between a closed position preventing flow of the rinse liquid out of the rinse tank and an open position permitting flow of the rinse liquid out of the rinse tank; a boom valve system including multiple spray section feed valves, in which each of the spray section feed valves is configured to actuate between a closed position preventing flow of the liquid product and the rinse liquid through a respective spray section and an open position permitting flow of the liquid product and the rinse liquid through the respective spray section; plumbing components connecting the product storage system, the rinse liquid storage system and the spray boom via the on-board and boom valve systems; and a control system for controlling the on-board and boom valve systems, the control system being configured to receive a rinse command upon which the control system controls one or more of the product tank outlet valve, the rinse tank outlet valve and the spray section feed valves for rinsing at least some of the plumbing components with the rinse liquid.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
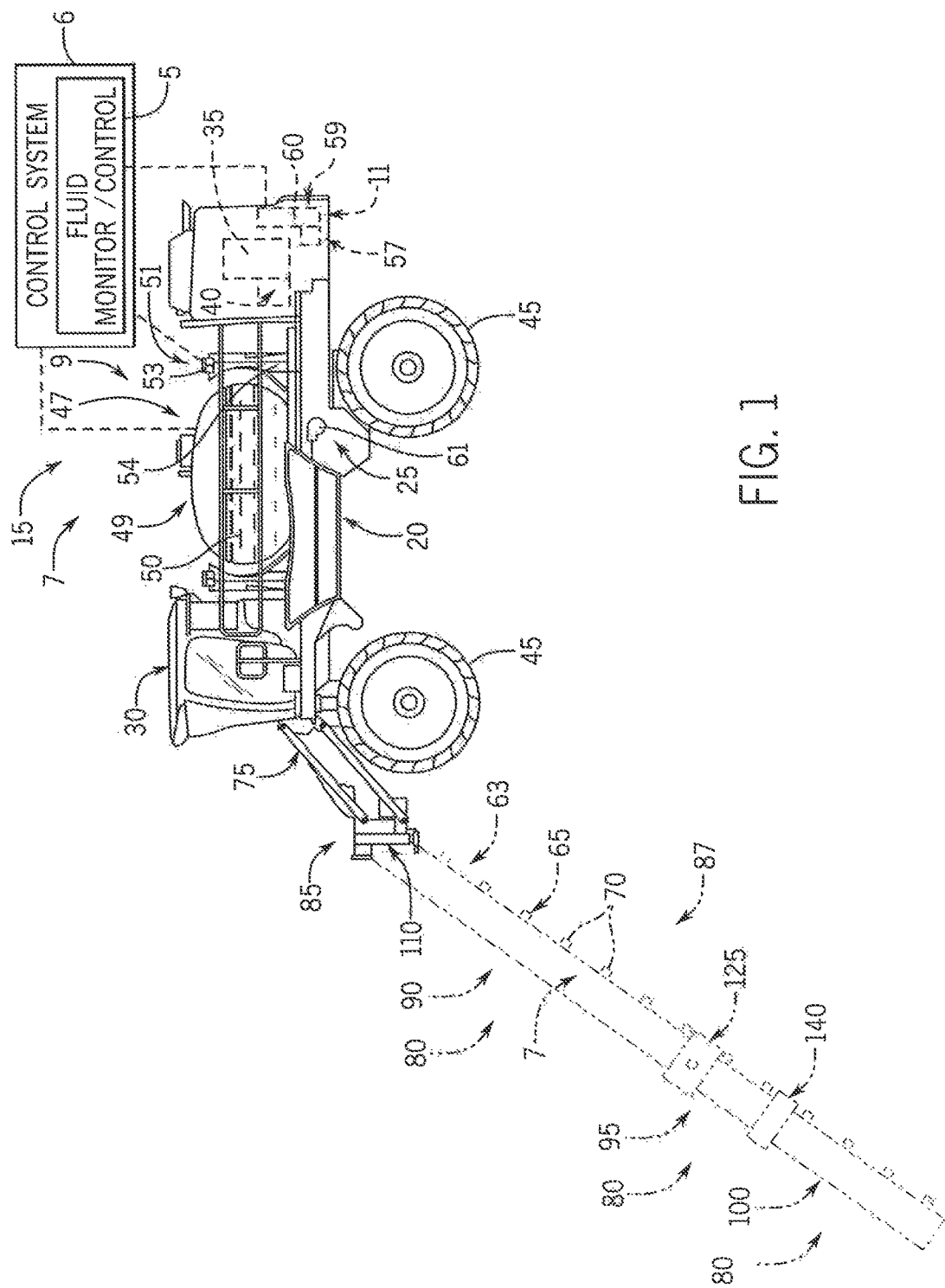
FIG. 1 is a side elevation of a self-propelled sprayer with a fluid flow monitoring, control and rinse system according to the present invention.

Referring now to the drawings and specifically to FIG. 1, a fluid flow monitoring, control and rinse system shown as flow system 5 of an overall control system 6 is provided for controlling a product system 7, a rinse system 9, and an air purge system 11, explained in greater detail elsewhere herein, and is shown for use with an agricultural sprayer. The agricultural sprayer is shown here as a self-propelled agricultural sprayer vehicle or self-propelled sprayer 15 having a spray boom 17. Although sprayer 15 is shown as a front-mounted boom self-propelled sprayer, it is understood that self propelled versions of sprayer 15 can have either front-mounted or rear-mounted booms, such as those available from CNH Industrial, including the Miller Nitro and Condor Series sprayers and New Holland Guardian Series sprayers.

Still referring to FIG. 1, sprayer 15 includes chassis 20 having chassis frame 25 that supports various assemblies, systems, and components. These various assemblies, systems, and components include cab 30, engine 35, and hydraulic system 40. Hydraulic system 40 receives power from engine 35 and includes at least one hydraulic pump which may be in a hydrostat arrangement for providing hydraulic pressure for operating hydraulic components within the hydraulic system 40. For sprayers with hydrostatic drives, hydraulic motors are operably connected to the hydraulic pump(s) for rotating wheels 45. In mechanical drive applications, a mechanical transmission receives power from engine 35 and delivers power for rotating wheels 45 by way of power-transmitting driveline components such as drive shafts, differentials, and other gear sets in portal, drop boxes, or other housings.

Still referring to FIG. 1, product system 7 includes a product storage system 47 with product tank 49 storing an agricultural liquid product 50 on the sprayer 15 on a chassis of the sprayer 15. Product 50 includes any of a variety of agricultural liquid products, such as various pesticides, herbicides, fungicides, liquid fertilizers, and other liquids including liquid suspensions beneficial for application onto agricultural fields by way of boom 17. Rinse system 9 includes a rinse liquid storage system 51 having rinse tank 53 storing a rinse liquid 54 such as water or another suitable rinse liquid. Air purge system 11 includes a compressed air storage system 55 having an air compressor 57 operably connected to air tank 59 that stores air 60 compressed by compressor 57. Flow system 5 is configured to selectively direct liquid product 50, rinse liquid 54, or air 60 through various flow paths defined through the sprayer 15 and boom 17 depending on whether a spraying procedure, a rinsing procedure, or a pneumatic purging or boom blow-out procedure is being performed. During spraying and rinsing procedures, flow system 5 energizes a pump 61 to convey either liquid product 50 or rinse liquid 54 to boom 17.

Figure 2:
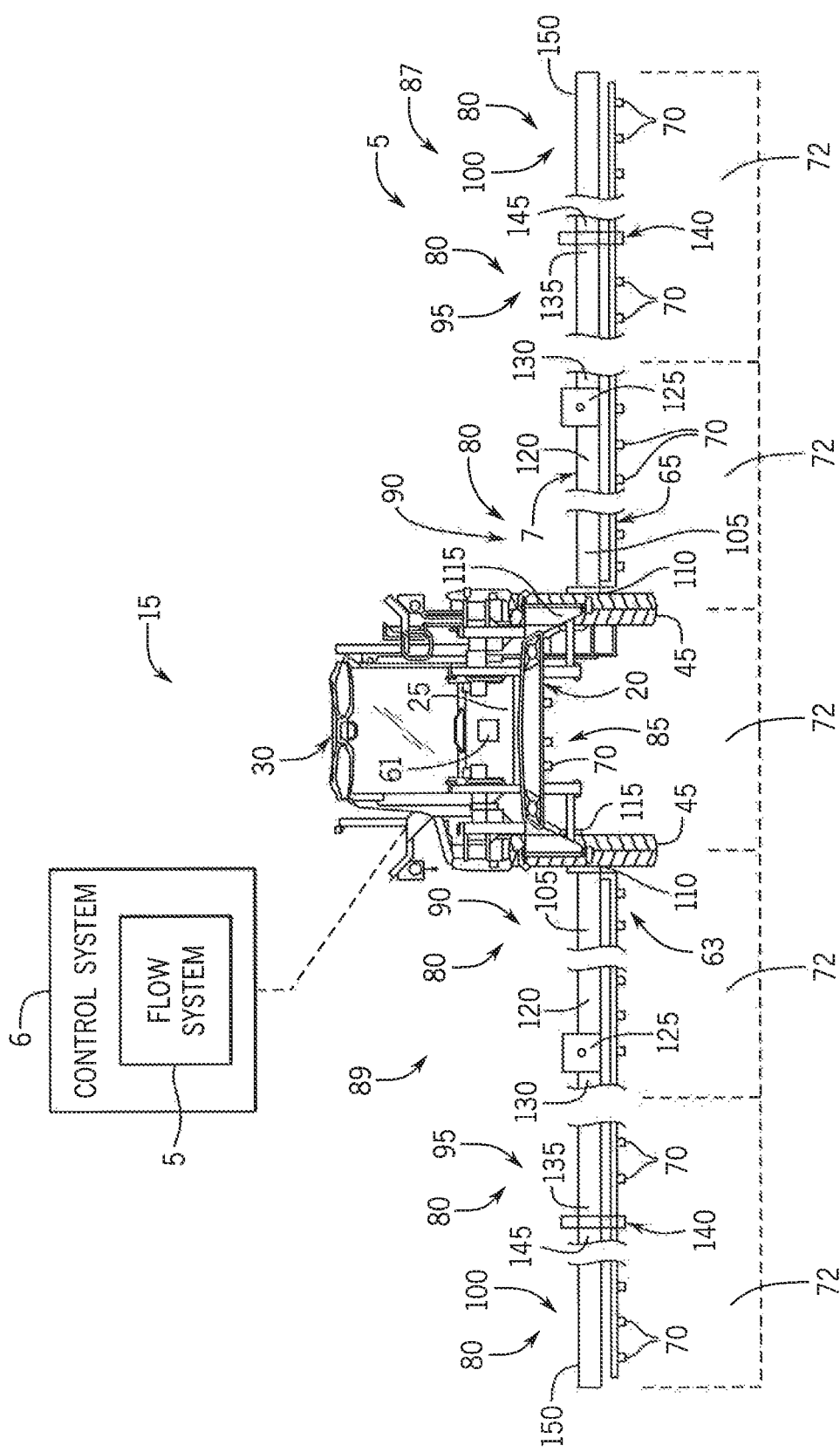
FIG. 2 is a front elevation of the self-propelled sprayer of FIG. 1.

Referring now to FIG. 2, pump 61 pushes either liquid product 50 or rinse liquid 54 through plumbing components such as interconnected pieces of tubing and through a boom flow system 63 that includes segments of boom tubing 65 for release out of spray nozzles 70 that are spaced from each another along the width of boom 17 during spraying or rinsing operations of sprayer 15. Accordingly, such plumbing components can connect the product storage system 47, the rinse liquid storage system 51 and the boom 17 via an on-board valve system and boom valve system as will be described herein. Groups or banks of multiple adjacent spray nozzles 70 define multiple spray sections 72 of a spray system of sprayer 15. During spraying procedures, spray sections 72 defined along boom 17 selectively deliver product 50 for release onto an agricultural field at locations corresponding to positions of activated spray sections 72. Boom 17 is connected to chassis 20 with lift arm assembly 75 that is configured to move the boom 17 up and down for adjusting the height of application of the product 50.

Still referring to FIG. 2, boom 17 includes multiple boom segments 80 connected longitudinally to provide the corresponding width of the assembled boom 17. Boom segments 80 include center section 85 and left and right boom arms 87, 89 extending in opposite directions from center section 85. Left and right boom arms 87, 89 have multiple segments with pairs of primary boom segments 90, secondary boom segments 95, and breakaway boom segments 100 extending in opposite directions along the respective left and right boom arms 87, 89 mirrored about a longitudinal axis of the sprayer 15. The corresponding left and right segments of the pairs of primary, secondary, and breakaway boom segments 90, 95, 100 are substantially identical, so only one will be described, with the description applying to both the left and right segments of left and right boom arms 87, 89. Primary boom segment 90 has a primary boom inner end 105 that is connected with hinge 110 to center section outer end 115, with hinge 110 configured to allow for generally rearward horizontal pivoting of the boom primary, secondary, and breakaway segments 90, 95, 100 toward the chassis 20 when folding boom 17 to achieve a stored position. Primary boom segment 90 extends from primary boom inner end 105 away from center section 85 to primary boom outer end 120. Hinge 125 is arranged between primary boom outer end 120 and secondary boom inner end 130 and is configured to allow for folding the secondary and breakaway segments 95, 100 relative to primary boom segment 90 to achieve the stored position. For horizontal folding of secondary and breakaway segments 95, 100 against the primary boom segment 90, the hinge 125 allows horizontal pivoting of the secondary and breakaway segments 95, 100 toward primary boom segment 90. For vertical folding of secondary and breakaway segments 95, 100 against the primary boom segment 90, the hinge 125 allows vertical pivoting of the secondary and breakaway segments 95, 100 toward primary boom segment 90. Secondary boom segment 95 extends from secondary boom inner end 130 away from primary boom segment 90 to secondary boom outer end 135. Breakaway joint 140 is arranged between secondary boom outer end 135 and breakaway boom inner end 145 and is configured to allow for momentary deflecting of the breakaway boom segment 100 away from its outwardly extended position during collisions with the crops, the ground, and/or other obstacles. Breakaway boom segment 100 extends from breakaway boom inner end 145 away from secondary boom segment 95 to breakaway boom outer end 150, in the stored position of boom 17, the secondary and breakaway boom segments 95, 100 are folded against the primary boom segment 90. The primary boom segment 90 is folded toward chassis 20 so that the breakaway boom outer end 150 is near the primary boom inner end 105 tucked toward the front of sprayer 15 with the primary boom outer end 120 and secondary boom inner end 130 tucked toward the back of sprayer 15.

Figure 3:
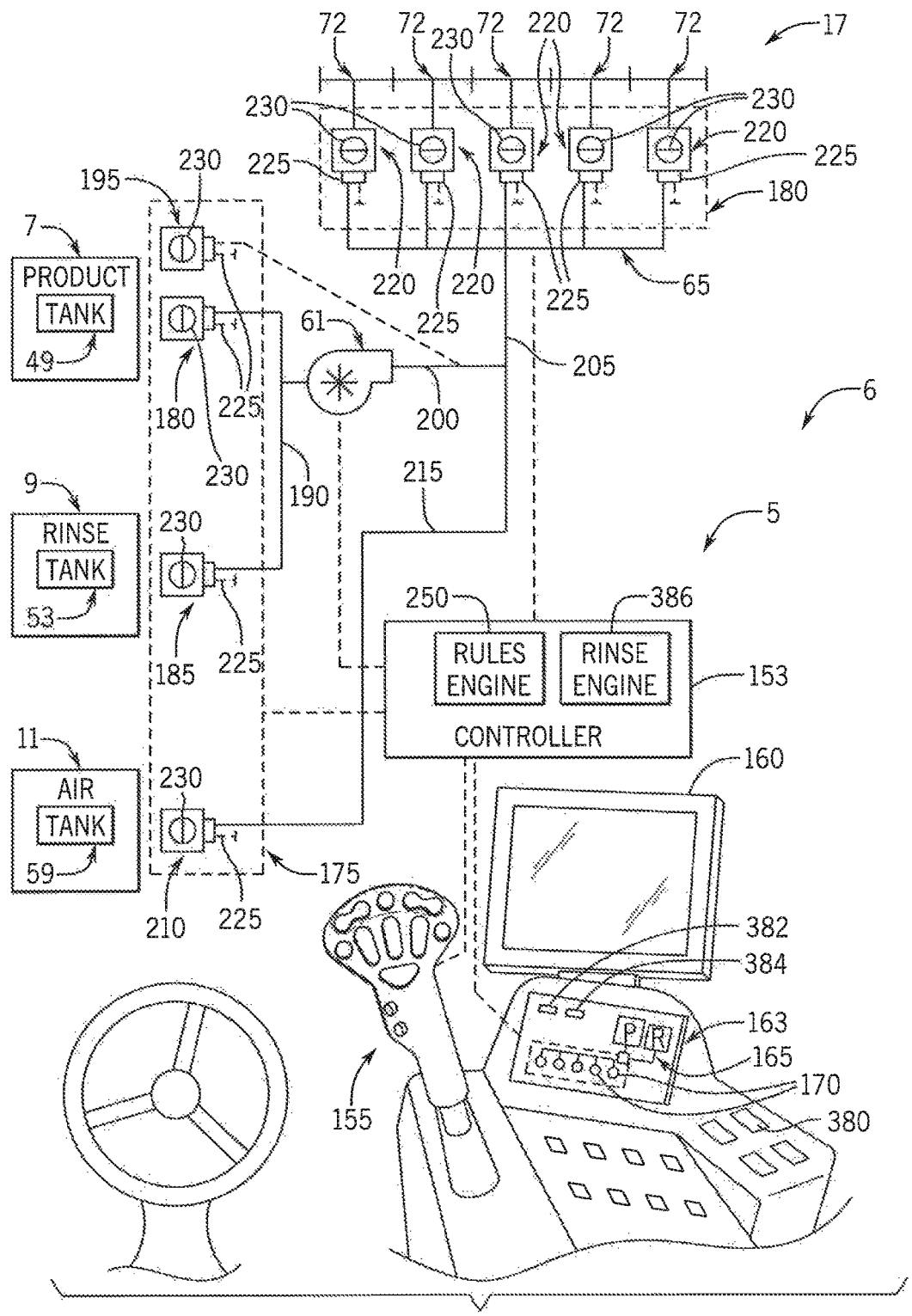
FIG. 3 is a simplified partially schematic pictorial view of the fluid flow monitoring, control and rinse system.

Referring now to FIG. 3, in addition to flow system 5, control system 6 includes various control subsystems configured to control other operations of sprayer 15, such as controlling steering, speed, braking, shifting, and other operations of the sprayer 15, including controlling movements of boom 17 such as height adjustments and folding and unfolding procedures.

Still referring to FIG. 3, control system 6 has at least one master controller or machine controller, shown as controller(s) 153. Controller(s) 153 includes a microprocessor and may be implemented as a programmable logic controller (PLC) other industrial computer, along with corresponding software and suitable memory for storing such software and hardware including interconnecting conductors for power and signal transmission and communication for controlling electronic, electro-mechanical, pneumatic, and hydraulic components of the sprayer 15. Communication may be done through one or more serial bus systems such as a CAN (controller area network) bus(es) between controller 153 and various intelligent devices as well as sensors, actuators, and/or other components of sprayer 15 for monitoring and controlling the corresponding systems and components of the sprayer 15, which may be established as nodes on the bus. The CAN bus(es) may implement an ISO or other suitable specification or protocol. In this way, control system 6 is configured for controlling steering, speed, braking, shifting, and other operations of the sprayer 15, including movement of boom 17 in addition to the fluid flow monitoring and control through the flow system 5.

Still referring to FIG. 3, control system 6 has multiple operator control interfaces that allow for operator control of the systems and components of sprayer 15. The operator control interfaces may include a joystick 155, a VT (virtual terminal) or field computer 160, and monitor 163 with a touchscreen 165 as an HMI (human machine interface). Joystick 155 is movable forward and back for controlling speed and direction of sprayer 15 and has a grip with buttons for controlling various functions of sprayer 15 including movement characteristics such as range and speed controls. Boom and spray control buttons on joystick 155 are configured to control boom position spray section deactivation/activation such as sequentially turning sections off from either end, from the outside toward the other end and turning sections on in respective opposite directions. Field computer 160 may be configured for controlling precision agriculture-type procedures, as well as various components and systems of the sprayer 15. Sprayer monitor 163 with touchscreen 165 is shown integrated into a dashboard or control panel of the cab 30. Touchscreen 165 displays status information such as real-time status(es) of product system 7, rinse system 9, and air purge system 11 and corresponding components. Touchscreen 165 can communicate with a controller(s) and has various buttons displayed as generally shown as graphical buttons 170 for controlling product system 7, rinse system 9, and air purge system 11 and corresponding components through the controller(s) sending control signals and may receive feedback signals as bidirectional communication through an ISO bus and/or CAN bus. The controller (s) can include a programmable logic controller (PLC) or other industrial computer to communicate through the ISO bus and/or CAN bus to control various systems and components of the sprayer 15, along with corresponding software and suitable memory for storing such software and hardware including interconnecting conductors for power and signal transmission for controlling electronic, electro-mechanical, and hydraulic components of the sprayer 15. In this way, flow system 5 is configured for controlling steering, speed, braking, shifting, and other operations of the sprayer 15 in addition to the height and folding operations of boom 17 and controlling product system 7, rinse system 9, and air purge system 11 and corresponding components.

Still referring to FIG. 3, through the controller 153, touchscreen 165 is operably connected to on-board valve system 175 that communicates with product system 7, rinse system 9, and air purge system 11 and is controllable for changing characteristics such as flow path and the particular type of fluid being implemented on the sprayer 15. Through controller 153, touchscreen 165 is also operably connected to boom valve system 180 controllable for changing characteristics of boom flow system 63, such as changing a flow path through the boom flow system 63, which may include deactivating and activating spray sections 72 to prevent or allow spraying product 50 through the spray section 72, respectively. On-hoard valve system 175 includes various valves such as electronically actuated ball valves which include product tank outlet valve 180 configured to actuate between closed and open positions respectively preventing and permitting flow of liquid product 50 out of an outlet of product tank 49 toward pump 61. Rinse tank outlet valve 185 of on-board valve system 175 is configured to actuate between closed and open positions respectively preventing and permitting flow of rinse liquid 54 out of an outlet of rinse tank 53 toward pump 61. The product and rinse tank outlet valves 180, 185 feed a common pump feed line 190 connected to an inlet of pump 61. A recirculation valve 195 may be arranged downstream of pump 61, connected to pump outlet tube 200 that, when open, allows liquid pumped by pump 61 to flow through a recirculation circuit defined through tubing connecting back to product tank 49 instead of flowing through a boom feed line 205 connected to the boom tubing 65. Air tank outlet valve 210 of on-board valve system 175 is configured to actuate between closed and open positions, respectively, preventing and permitting flow of compressed air 60 out of an outlet of air tank 59. The air tank outlet valve 210 feeds an air line 215 that connects to boom feed line 205 for pneumatically purging or blowing out the boom tubing 65 and spray nozzles 70 (FIG. 2).

Still referring to FIG. 3, boom valve system 180 includes various valves such as electronically actuated ball valves including spray section feed valves 220, each receiving a fluid from the boom tubing 65 and selectively delivering the fluid to a respective one of the spray sections 72 of boom 17 and the spray nozzles 70 (FIG. 2) of the particular spray section 72. Each of the product, rinse, and air tank outlet valves 180, 185, 210 and the spray section feed valves 220 includes an actuator 225 that can be energized to move a valve body 230 between the open and closed positions. Actuation of the product, rinse, and air tank outlet valves 180, 185, 210 and energizing/de-energizing fan 61 by operator instructions inputted through the touchscreen 165 may be evaluated and modified by a rules engine 250. Rules engine 250 may be implemented through the controller 153 for performing evaluations and making various decisions, as explained in greater detail elsewhere herein.

Still referring to FIG. 3, the control system 6 can be configured to receive a rinse command upon which the control system 6 can controls one or more of the product tank outlet valve 180, the rinse tank outlet valve 185 and the spray section feed valves 220 for rinsing at least some of the plumbing components with the rinse liquid 54. To implement a "one touch" rinse system for automatic rinsing, the rinse command can be sent by a single rinse button pressed by an operator of the sprayer. In one aspect, the rinse button could be a physical rinse button 380 that is configured in the operator cab. However, in another aspect, the rinse button could be a virtual rinse button 382 that is implemented via the touchscreen 165 or the field computer 165. Accordingly, the rinse command can be communicated to the controller 153 via the ISO bus and/or CAN bus. As a result, the sprayer can be consistently and correctly rinsed, without requiring the operator to manually actuate valves and/or recall stages of the rinse sequence, as will be further described herein.

Figure 4:
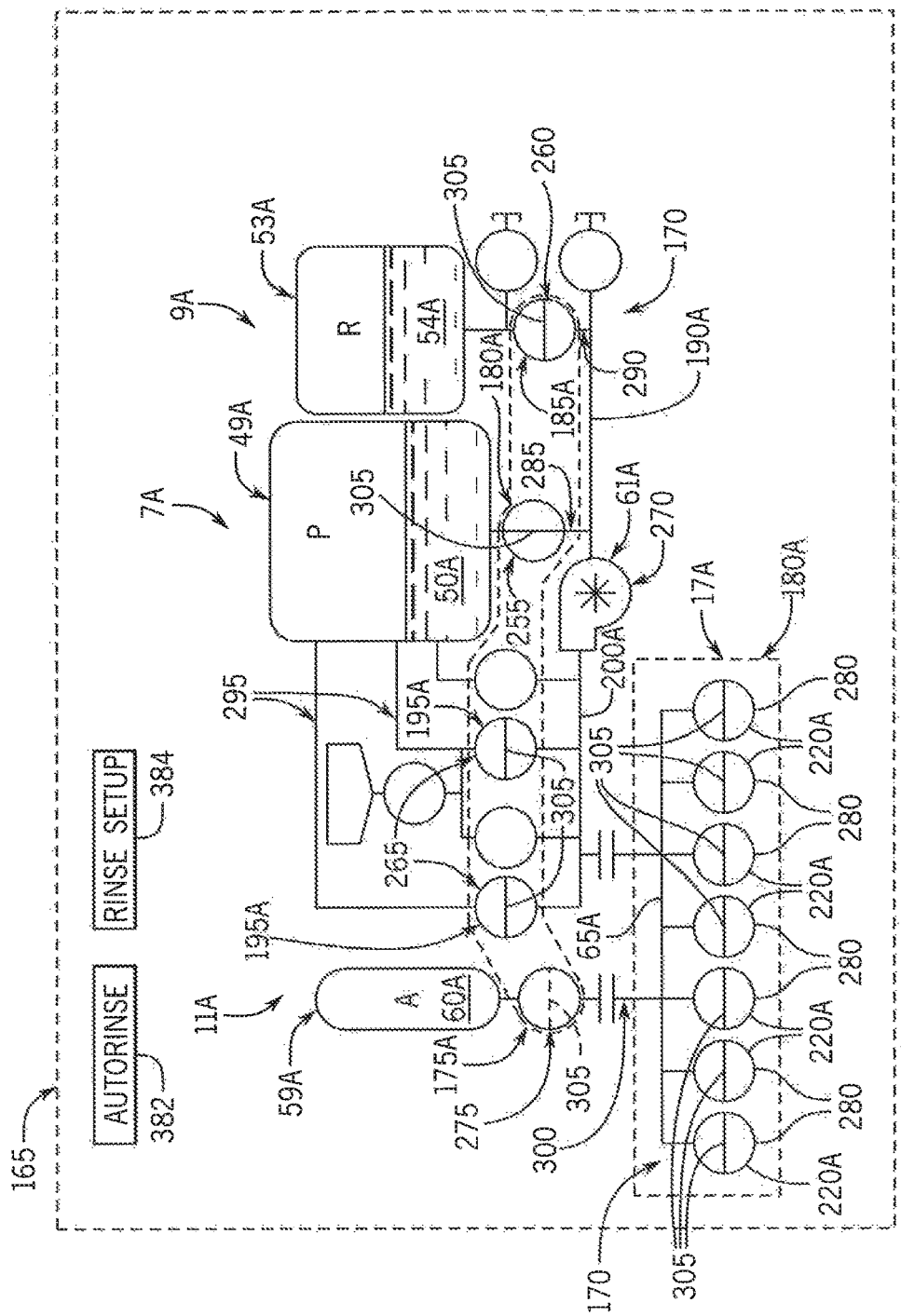
FIG. 4 is a simplified screenshot of a touchscreen of the fluid flow monitoring, control and rinse system of FIG. 3.

Referring now to FIG. 4, one of the operative screens of touchscreen 165 is shown providing a visual display of product system 7, rinse system 9, air purge system 11, and boom 17 and corresponding statuses by way of icon graphical representations. The graphical representations in FIG. 4 have the same labels as the component(s) and system(s) counterparts shown in FIG. 3, the statuses of which are represented, only having a label "A" following each numerical label. At least some of such graphical representations define buttons 170 that can be pressed for controlling corresponding components. Buttons 170 include product tank close/open button 255 that, when pressed, controls closing and opening the product tank outlet valve 180 (FIG. 3). Rinse tank close/open button 260, when pressed, controls closing and opening the rinse tank outlet valve 185 (FIG. 3). Recirculation activate/deactivate button(s) 265, when pressed, controls closing and opening the recirculation valve(s) 195 (FIG. 3). Pump activate/deactivate button 270, when pressed, energizes and de-energizes pump 61 (FIG. 3) to convey either liquid product 50 or rinse liquid 54 toward boom 17 (FIG. 3) or through the recirculation circuit back toward product tank 49. Air tank close/open button 275, when pressed, controls closing and opening the air tank outlet valve 210 (FIG. 3), releasing compressed air downstream through air line 215. Spray section activate/deactivate button(s) 280, when pressed, controls closing and opening the spray section feed valves 220 (FIG. 3).

Still referring to FIG. 4, buttons 170 and other graphic representations of components on the touchscreen 165 are configured to change visually to provide a visual indication of status. Status can include an active and/or inactive flow path(s) defined by a product circuit 285, rinse circuit 290, recirculation circuit 295, or airflow circuit 300 from the respective product, rinse, and air purge systems 7, 9, and 11 (FIG. 3), which are graphically represented as product, rinse, and air purge system icons 7A, 9A, and 11A. Product circuit 285 is defined along a flow path that flows from product tank 49A, through product tank outlet valve 180A, pump feed line 190A, pump 61A, pump outlet tube 200A, and into and through boom 17A. Rinse circuit 290 is defined along a flow path that flows from rinse tank 53A, through rinse tank outlet valve 185A, pump feed line 190A, pump 61A, pump outlet tube 200A, and into and through boom 17A. Recirculation circuit(s) 295 is defined along a flow path that flows from product or rinse tank 49A, 53A, through product or rinse tank outlet valve 180A, 185A, pump feed line 190A, pump 61A, pump outlet tube 200A, recirculation valve(s) 195 and into product tank 49A. Airflow circuit 300 is defined along a flow path that flows from air tank 59A, through air tank outlet valve 175A, and into and through boom 17A. The visual indication of status can include displaying a currently active one of the product, rinse, recirculation, and air circuits 285, 290, 295, 300 and their included components in the corresponding flow path in a common color that is visually conspicuous, such as being bright and bolder than the others with the inactive product, rinse, recirculation, and air circuits 285, 290, 295, 300 being grayed-out or white/uncolored.

Still referring to FIG. 4, the valve buttons such as product tank close/open button 255, rinse tank close/open button 260, recirculation activate/deactivate button(s) 265, air tank close/open button 275, and spray section activate/deactivate button(s) 280 are configured to visually change to represent status such as current status by changing orientation of a reference bar 305. Reference bar 305 is a graphical representation of valve bodies 230 (FIG. 3) of the corresponding product tank outlet valve 180, rinse tank outlet valve 185, recirculation valve(s) 195, air tank outlet valve 210, and spray section feed valves 220. Bars 305 are arranged horizontally or perpendicularly relative flow direction through longitudinal axes respective tubing segment(s) when representing a closed status of the corresponding valve and vertical or aligned with the flow direction through longitudinal axes of the respective tubing segment(s) when representing an open status of the corresponding valve.

Still referring to FIG. 4, the graphical representations can also define the virtual rinse button 382 ("autorinse"), as well as a virtual rinse setup button 384 ("rinse setup"). The rinse setup button 384 can be used for receiving rinse configuration information from an operator for customizing one or more aspects of rinsing as will be described herein.

Referring now to FIGS. 3 and 4, open and/or closed status of each of the product tank outlet valve 180, rinse tank outlet valve 185, recirculation valve(s) 195, air tank outlet valve 210, and spray section feed valves 220 can be determined for representation of orientation of bars 305 (FIG. 4) on touchscreen 165 by way of bidirectional communications with controller 153 (FIG. 3). Controller 153 command signals to the valves 180, 185, 195, 210, 220 to energize the respective actuator 225 to move the corresponding valve body 230 to the open position on the closed position, depending on desired system performance or procedures of sprayer 15 (FIG. 1) at a given time which may be inputted through the touchscreen 165 and/or otherwise commanded by controller 153. Each of valves 180, 185, 195, 210, 220 sends a response to feedback signal to controller 153, corresponding to its open or closed position as a current valve status. Based on this current valve status, controller 153 commands the corresponding bars 305 to display in the respective closed or open orientation, along with visually indicating the corresponding flow path for active circuit the results from the statuses of the valves.

Figure 5:
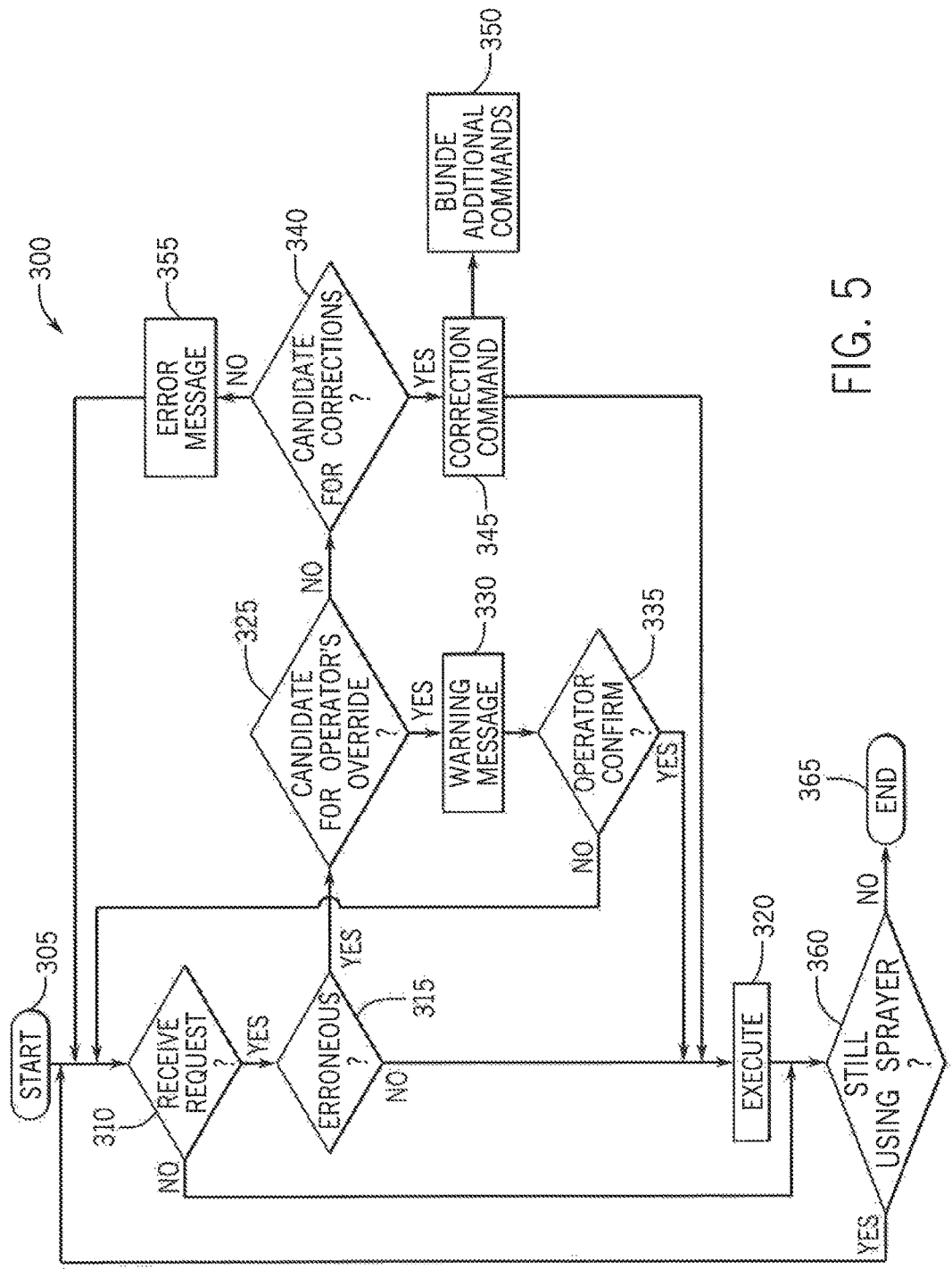
FIG. 5 is a flow diagram of a process used by a rules engine of the fluid flow monitoring, control and rinse system.

Referring now to FIGS. 3-5, rules engine 250 (FIG. 3) is configured to evaluate operator requests inputted through buttons 170 of touchscreen 165 (FIG. 4), allow and implement the request, implement the request along with a correction command, and/or deny the request, at least some of which may be accompanied by a message displayed on the touchscreen 165 which may include asking operator confirmation, providing an error or warning message.

Referring now to FIG. 5 and with further references to FIGS. 3 and 4, process 300 schematically represents a process that rules engine 250 (FIG. 3) may implement when evaluating operator requests to prevent erroneous states of operation within the systems of sprayer 15. As represented at block 305, process 300 starts when use of sprayer 15 begins. As represented at blocks 310 and 315, when an operator makes a request to the touchscreen 165 for controlling and changing the state of a component(s) of product system 7, rinse system 9, air purge system 11, and boom 17, the rules engine torque 50 evaluates the request to determine whether the request is erroneous. This may be done by referring to a lookup table or other stored values, at controller 153 or elsewhere, which correspond to potentially erroneous states. Examples of requests include pressing various ones of the valve buttons such as product tank close/open button 255, rinse tank close/open button 260, recirculation activate/deactivate button(s) 265, pump activate/deactivate button 270, air tank close/open button 275, and spray section activate/deactivate button(s) 280 for activating or deactivating product, rinse, and air circuits 285, 290, 295, 300, pump 61, or various ones of the spray sections 72. As represented at block 315, the rules engine 250 determines that the request is not erroneous, and controller 153 executes the request as represented at block 320, such as by sending a command to actuate the corresponding valve(s) or turn the pump 61 on or off. If, at block 315, the rules engine 250 determines that the request is erroneous, the rules engine 250 determines whether the release request is a candidate to be overridden and thus allowed by the operator as represented at block 325. An erroneous request that is a candidate to be overridden includes requests that, in some situations, could be acceptable. This may include a request to activate the recirculation circuit 295 (FIG. 3) by pressing one of the recirculation buttons 265 when the rinse circuit 290 is activated. This request would result in rinse liquid 54 being pumped through the recirculation circuit 295 into the product tank 49. This action may be acceptable if the product tank 49 is empty and the purpose of the request is to perform onboard rinsing of the product tank 49. As represented at block 330, controller 153 displays a warning message on the touchscreen 165 indicating that rinse liquid 54 would be pumped into the product tank 49. As represented at block 335, controller 153 displays a request for confirmation from the operator that this is the procedure the operator wants to perform. If the operator does not confirm, then the request is not executed and rules engine 250 awaits the next request at block 310. If the operator confirms that the request corresponds to the intended procedure, then the controller 153 executes the request at block 320. Referring again to block 325, the erroneous request may not be a candidate for the operator's override. This may happen when the request leads to a high risk of compromising the integrity of a component of one of the systems or other system performance characteristics. During such a situation, the rules engine 250 determines whether the request is a candidate for correction as represented at block 340. If so as represented at block 345, the rules engine 250 provides a corresponding correction command that converts the erroneous request to an acceptable request. As represented at block 350, this may include bundling additional commands with the command that corresponds to the erroneous request. One such bundled additional command(s) is a correction command to deactivate an already activated one of the product and rinse circuits 285, 290 when the operator requests turning on the other one product and rinse circuits 285, 290. Stopping delivery of the liquid product 50 or rinse liquid 54 before starting delivery of the other ensures that only one of the liquid product 50 and rinse liquid 54 is delivered to pump 61 at any given time, avoiding simultaneous feeding the different liquids. The correction command and/or bundled additional commands as a resolved erroneous command is then executed at block 320. Referring again to block 340, if the erroneous request is not a candidate for correction, the new correction command is generated. This may happen in situations that could lead to rapid part failure such as cavitation of a suction side of pump 61 when neither liquid product 50 nor rinse liquid 54 is being fed to the inlet of pump 61. Energizing pump 61 with both the product tank valve 180 (FIG. 3) and the rinse tank outlet valve 185 turned off could lead to cavitation on the suction side of pump 61. In such a situation, as represented at block 350, controller 153 displays an error message on the touchscreen 165 and does not perform the requested action. The error message may include a description of component statuses relating to the erroneous request along with a recommendation for resolving the erroneous request, such as recommending opening one of the product and rinse tank outlet valves 180, 185 before activating pump 61. This process is repeated as long as the sprayer 15 is being used, as represented at blocks 360 and 365.

Referring again to FIG. 3, the controller 153 can include a rinse engine 386 configuring to control rinsing on the sprayer 15. The rinse engine 386 can receive the rinse command, which can be sent, for example, by the physical rinse button 380 or the virtual rinse button 382, for "one touch"/automatic rinsing on the sprayer 15. The rinse engine 386 can also receive the rinse configuration information, which can be sent, for example, by the rinse setup button 384.

Figure 6:
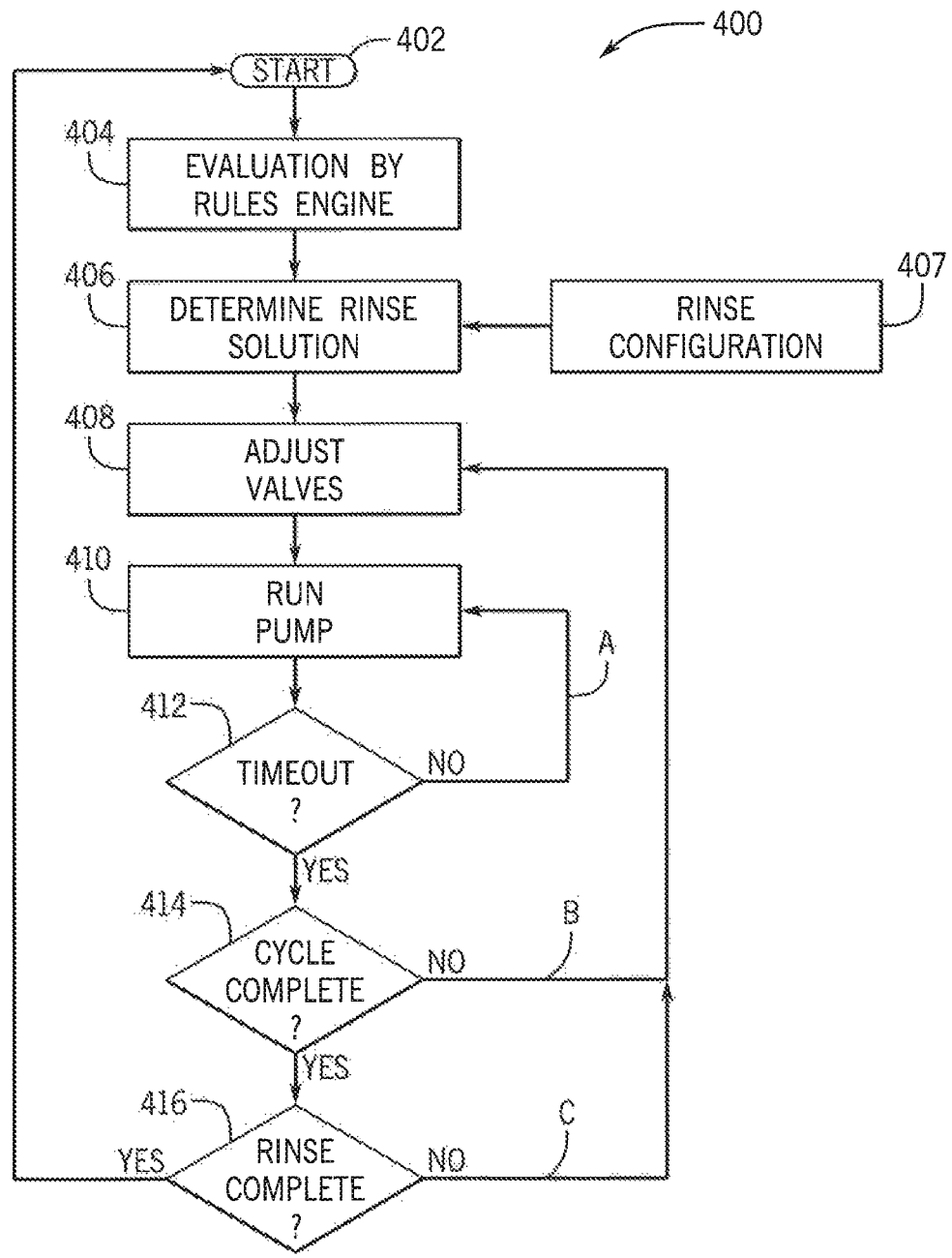
FIG. 6 is a flow diagram of a process used by a rinse engine of the fluid flow monitoring, control and rinse system.

With additional reference to FIG. 6, a flow diagram of a process 400, used by the rinse engine 386, is provided according to an aspect of the present invention. Beginning at step 402 ("start"), the process 400 can be initiated by an operator pressing the physical rinse button 380 or the virtual rinse button 382. Next, at step 404, the rinse engine 386 can invoke the rules engine 250 to evaluate the rinse command to determine whether the rinse command is erroneous based on the current configuration of the sprayer 15. This may be done by referring to a lookup table or other stored values, at controller 153 or elsewhere, which correspond to potentially erroneous states. An erroneous state the rules engine 250 can determine can be a rinse command to rinse the product tank 49 while the product tank still contains an amount of product 50 exceeding a threshold. Accordingly, the rules engine 250 can prevent a mixed product/rinse erroneous state in which both the product outlet valve and the rinse tank outlet valve are in the open position and an amount of product 50 exceeding the threshold remains. However, a rinse command to rinse the product tank 49 while the product tank still contains an amount of product 50 exceeding the threshold can nevertheless be treated as a candidate to be overridden, as described above with respect to FIG. 5, and thus allowed by the operator.

If the rules engine 250 determines that the request is not erroneous, the process 400 can continue to step 406 in which the rinse engine 386 can execute an algorithm to determine an optimal solution for rinsing the sprayer 15 as configured. In step 406, the rinse engine 386 can consider information concerning the configuration of the sprayer 15, such as the product storage system 47, the rinse liquid storage system 51, the spray boom 17, the on-board valve system 175, the boom valve system 180, the pump 61 and/or plumbing components connecting such systems and pumps. This may be done by referring to a lookup table or other stored values, at controller 153 or elsewhere.

Figure 7:
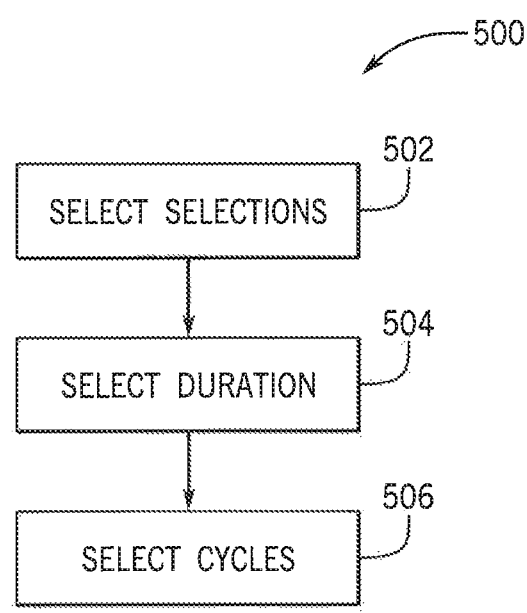
FIG. 7 is a flow diagram of a process used for receiving rinse configuration information for customizing one or more aspects of rinsing by the rinse engine.

The rinse engine 386 can also consider rinse configuration information provided by an operator at input step 407. With additional reference to FIG. 7, a flow diagram of a rinse configuration information input process 500 used for receiving rinse configuration information for customizing one or more aspects of rinsing by the rinse engine 386 is provided according to an aspect of the present invention. The rinse configuration information can be received, for example, by a user initiating the rinse configuration information input process 500, on the touchscreen 165, via the rinse setup button 384. In one aspect, the rinse configuration information input process 500 can include a first input step 502 for selecting sections of the sprayer 15 for rinsing. Such sections can include, for example, the product storage system 47, the spray boom 17, the on-board valve system 175, the boom valve system 180, the pump 61 and/or plumbing components connecting such systems and pumps. Next, a second input step 504 can allow selecting durations for rinsing. The durations for rinsing can control times in which each of the on-board valve system 175 and/or the boom valve system 180 are actuated during rinsing. In one aspect, an operator can simply be prompted for a "basic" rinsing in which the on-board valve system 175 and/or the boom valve system 180 are quickly actuated, such as on the order of seconds, or for an "extended" rinsing, in which the on-board valve system 175 and/or the boom valve system 180 are actuated with greater delay, such as on the order of minutes. Finally, a third input step 506 can allow selecting a number of rinse cycles for rinsing, such as 1, 2, 3 or 4 rinse cycles. Each rinse cycle can provides actuation, for example, of each of the product tank outlet valve 180, the rinse tank outlet valve 185 and/or the spray section feed valves 220 in an open position permitting flow of the rinse liquid 54 and in a closed position preventing flow of the rinse liquid 54. Fewer rinse cycles may be desirable for faster rinsing, whereas more rinse cycles may be desirable for more extensive rinsing.

Referring again to FIG. 6, upon the rinse engine 386 determining an optimal solution for rinsing the sprayer 15 in step 406, the process 400 can continue to step 408 in which the rinse engine 386 can execute the optimal solution by initially adjusting the on-board valve system 175, the boom valve system 180 and/or the pump 61 as necessary in a first valve sequence. Then, the process 400 can continue to step 410 in which the rinse engine 386 can control the pump 61 to rinse selected elements of the sprayer 15, such as according to the selections at step 502 (FIG. 5), perhaps in a first liquid flow direction. At decision step 412, the rinse engine 386 can monitor the duration of rinsing in the first valve sequence, and can remain in a first loop ("A") in the first valve sequence until a timed expiration, such as according to the selections at step 504 (FIG. 5). Upon reaching the timed expiration, the process 400 can continue to decision step 414 in which the rinse engine 386 can determine whether the current rinse cycle is complete. If the current rinse cycle is not complete, the process 400 can return to step 408 in which the rinse engine 386 can adjust the on-board valve system 175, the boom valve system 180 and/or the pump 61 as necessary in a second valve sequence. Then, the process 400 can continue again to step 410 in which the rinse engine 386 can control the pump 61 to rinse selected elements of the sprayer 15, perhaps in a second liquid flow direction. Accordingly, at decision step 414, the rinse engine 386 can monitor the sequence of rinsing, and can remain in a second loop ("B") until the sequence completes.

However, if the current rinse cycle is complete, the process 400 can continue to decision step 416. At decision step 416, the rinse engine can determine whether a required number of rinse cycles have been completed, such as according to the selections at step 506 (FIG. 5). If the required number of rinse cycles has not been completed, the process can return to step 408 to begin another rinse cycle in a third loop ("C"). However, if the required number of rinse cycles has been completed, the process can return to step 402 to await a next rinse command.

Thus, by way of touchscreen 165, full view and control of the various fluid systems of sprayer 15, including valve activation and deactivation patterns in the sprayer 15, including for rinsing, may be achieved without using field computer 160.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A rinse system for a self-propelled agricultural sprayer, the rinse system comprising:
    a product storage system having a product tank storing an agricultural liquid product on a chassis of the sprayer;
    a rinse liquid storage system having a rinse tank storing a rinse liquid on the chassis;
    a spray boom supported by the chassis of the sprayer and defining multiple spray sections for receiving the liquid product and the rinse liquid and selectively delivering the liquid product and the rinse liquid to a field;
    a pump arranged between the spray boom and the product and rinse tanks for delivering liquid product and rinse liquid from the product and rinse tanks to the spray boom, respectively, the pump being configured to deliver the rinse liquid in first and second liquid flow directions during a rinse cycle;
    an on-board valve system including a product tank outlet valve configured to actuate between a closed position preventing flow of the liquid product out of the product tank and an open position permitting flow of the liquid product out of the product tank and a rinse tank outlet valve configured to actuate between a closed position preventing flow of the rinse liquid out of the rinse tank and an open position permitting flow of the rinse liquid out of the rinse tank;
    a boom valve system including multiple spray section feed valves, wherein each of the spray section feed valves is configured to actuate between a closed position preventing flow of the liquid product and the rinse liquid through a respective spray section and an open position permitting flow of the liquid product and the rinse liquid through the respective spray section;
    plumbing components connecting the product storage system, the rinse liquid storage system and the spray boom via the on-board and boom valve systems; and
    a control system operatively connected to the on-board and boom valve systems, the control system including a user interface adapted to receive a user instruction regarding operation of the product tank outlet valve, the rinse tank outlet valve and each of the multiple spray section feed valves and being configured to:

evaluate the user instruction to determine if the user instruction received is erroneous, and if so, provide to the user at least one of a first signal indicating the user instruction is erroneous and a second signal indicating the erroneous user instruction may be overwritten; and actuate one or more of the product tank outlet valve, the rinse tank outlet valve and the spray section feed valves for rinsing at least some of the plumbing components with the rinse liquid in response to one of a non-erroneous user instruction and an overwritten erroneous user instruction; and inhibit energizing of the pump with both the product tank valve and the rinse tank outlet valve in the closed positions.

2. The rinse system of claim 1, wherein the user interface of the control system further includes a configuration input adapted to allow the user to configure one or more aspects of the rinsing.

3. The rinse system of claim 2, wherein the user interface includes a selector to allow the user to configure the rinse system to rinse the product tank with the rinse liquid.

4. The rinse system of claim 2, wherein the user interface includes a selector to allow the user to configure the rinse system for a duration for rinsing, wherein the duration for rinsing controls a time in which each of the product tank outlet valve, the rinse tank outlet valve and the spray section feed valves are actuated during the rinsing.

5. The rinse system of claim 2, wherein the user interface includes a selector to allow the user to configure the rinse system for a number of rinse cycles for the rinsing, wherein each rinse cycle provides actuation of each of the product tank outlet valve, the rinse tank outlet valve and the spray section feed valves in an open position permitting flow of the rinse liquid and in a closed position preventing flow of the rinse liquid.

6. The rinse system of claim 1, wherein the user interface includes a touchscreen with a first set of buttons controlling the boom valve system, a second set of buttons controlling the on-board valve system, and a rinse button for receiving the rinse command.

7. The rinse system of claim 6, wherein the rinse command is communicated to the control system through an International Organization for Standardization (ISO) bus or a Controller Area Network (CAN) bus.

8. The rinse system of claim 1, wherein the user interface of the control system includes a display, the display configured to display the first signal when the pump is activated with both the product outlet valve in the closed position and the rinse tank outlet valve in the closed position.

9. A rinse system for a self-propelled agricultural sprayer, the rinse system comprising:
a product storage system having a product tank storing an agricultural liquid product on a chassis of the sprayer;
a rinse liquid storage system having a rinse tank storing a rinse liquid on the chassis;
a spray boom supported by the chassis of the sprayer and defining multiple spray sections for receiving the liquid product and the rinse liquid and selectively delivering the liquid product and the rinse liquid to a field;
an on-board valve system including a product tank outlet valve configured to actuate between a closed position preventing flow of the liquid product out of the product tank and an open position permitting flow of the liquid product out of the product tank and a rinse tank outlet valve configured to actuate between a closed position preventing flow of the rinse liquid out of the rinse tank and an open position permitting flow of the rinse liquid out of the rinse tank;
a boom valve system including multiple spray section feed valves, wherein each of the spray section feed valves is configured to actuate between a closed position preventing flow of the liquid product and the rinse liquid through a respective spray section and an open position permitting flow of the liquid product and the rinse liquid through the respective spray section;
plumbing components connecting the product storage system, the rinse liquid storage system and the spray boom via the on-board and boom valve systems; and
a control system operatively connected to the on-board and boom valve systems, the control system including a user interface adapted to receive a user instruction regarding operation of the product tank outlet valve, the rinse tank outlet valve and each of the multiple spray section feed valves and being configured to:
evaluate the user instruction to determine if the user instruction received is erroneous, and if so, provide to the user at least one of a first signal indicating the user instruction is erroneous and a second signal indicating the erroneous user instruction may be overwritten; and
actuate one or more of the product tank outlet valve, the rinse tank outlet valve and the spray section feed valves for rinsing at least some of the plumbing components with the rinse liquid in response to one of a non-erroneous user instruction and an overwritten erroneous user instruction;

wherein the user interface of the control system includes a display, the display configured to display the first signal in response to a request to activate the pump when both the product outlet valve and the rinse tank outlet valve are in the closed position.

10. The rinse system of claim 8, wherein the user interface of the control system includes a display, the display configured to display the first signal when both the product outlet valve and the rinse tank outlet valve are in the open position.

11. The fluid flow system of claim 1, further comprising an air purge system comprising an air tank storing compressed air and wherein,
the on-board valve system further comprises an air tank outlet valve configured to actuate between a closed position preventing flow of the compressed air toward the spray boom and an open position permitting flow of the compressed air out of the air tank to the spray boom for pneumatically purging spray nozzles of the spray boom; and
the control system is configured to control the air tank outlet valve during the rinsing.

12. The rinse system of claim 1, wherein the user interface includes a monitor displaying a current state of each of the product tank outlet valve, the rinse tank outlet valve and the spray section feed valves with the current state corresponding to whether the product tank outlet valve, the rinse tank outlet valve and the spray section feed valves are in the closed or open positions at a current time.

13. A self-propelled agricultural sprayer, comprising:
a chassis;
a product storage system having a product tank storing an agricultural liquid product on the chassis;
a rinse liquid storage system having a rinse tank storing a rinse liquid on the chassis;

a spray boom supported by the chassis and including multiple spray nozzles selectively delivering the liquid product and the rinse liquid to a field;

a pump arranged between the spray boom and each of the product tank and the rinse tank to convey the liquid product and the rinse liquid toward the spray boom;

an on-board valve system including:
- a product tank outlet valve configured to actuate between a closed position preventing flow of the liquid product out of the product tank and an open position permitting flow of the liquid product out of the product tank to the pump for delivery toward the spray boom;
- a rinse tank outlet valve configured to actuate between a closed position preventing flow of the rinse liquid out of the rinse tank and an open position permitting flow of the rinse liquid out of the rinse tank to the pump for delivery toward the spray boom;

plumbing components connecting the product storage system, the rinse liquid storage system and the spray boom via the on-board and boom valve systems; and a control system operatively connected to the on-board and boom valve systems, the control system including an operator interface adapted to receive a rinse command from a user regarding operation of the product tank outlet valve, the rinse tank outlet valve and each of the multiple spray section feed valves and a monitor for displaying a current state of each of the product tank outlet valve, the rinse tank outlet valve and the spray section feed valves with the current state corresponding to whether the product tank outlet valve, the rinse tank outlet valve and the spray section feed valves are in the closed or open positions at a current time, wherein the control system is configured to:
- evaluate the rinse command to determine if the rinse command received is erroneous, and if so, display to the user at least one of a first signal indicating the rinse command is erroneous and a second signal indicating the erroneous rinse command may be overwritten; and
- actuate one or more of the product tank outlet valve, the rinse tank outlet valve and the spray section feed valves for rinsing at least some of the plumbing components with the rinse liquid in response to one of a non-erroneous rinse command and an overwritten erroneous rinse command;
- inhibit energizing of the pump with both the product tank valve and the rinse tank outlet valve in the closed positions.

14. The self-propelled agricultural sprayer of claim 13, wherein the operator interface of the control system includes a configuration input adapted to allow the user to configure one or more aspects of the rinsing.

15. The self-propelled agricultural sprayer of claim 14, wherein the operator interface includes a selector to allow the user to configure the rinse system to rinse the product tank with the rinse liquid.

16. The self-propelled agricultural sprayer of claim 14, wherein the operator interface includes a selector to allow the user to configure the rinse system for a duration for rinsing, wherein the duration for rinsing controls a time in which each of the product tank outlet valve, the rinse tank outlet valve and the spray section feed valves are actuated during the rinsing.

17. The self-propelled agricultural sprayer of claim 14, wherein the operator interface includes a selector to allow the user to configure the rinse system for a number of rinse cycles for the rinsing, wherein each rinse cycle provides actuation of each of the product tank outlet valve, the rinse tank outlet valve and the spray section feed valves in an open position permitting flow of the rinse liquid and in a closed position preventing flow of the rinse liquid.

18. The self-propelled agricultural sprayer of claim 13, wherein the monitor of the control system is configured to display the first signal when the pump is activated with both the product outlet valve in the closed position and the rinse tank outlet valve in the closed position.

19. The self-propelled agricultural sprayer of claim 18, wherein the monitor of the control system is configured to display the first signal when both the product outlet valve and the rinse tank outlet valve are in the open position.

* * * * *